United States Patent [19]

Chuang

[11] Patent Number: 5,231,787
[45] Date of Patent: Aug. 3, 1993

[54] STABLE BOBBER FOR ROD FISHING

[76] Inventor: Yung-Chuan Chuang, No. 142, Shin Fuh Road, Feng Shan City, Kaohsung County, Taiwan

[21] Appl. No.: 932,310

[22] Filed: Aug. 19, 1992

[51] Int. Cl.$^5$ ............................................. A01K 91/00
[52] U.S. Cl. ................... 43/43.1; 43/43.13; 43/44.87
[58] Field of Search .................. 43/44.87, 44.94, 43.1, 43/44.9, 43.13, 44.95, 44.92

[56] References Cited

U.S. PATENT DOCUMENTS

| D. 180,529 | 6/1957 | Sehle | 43/43.1 |
|---|---|---|---|
| 691,407 | 1/1902 | Pacelty | 43/44.9 |
| 2,729,015 | 1/1956 | Finnegan | 43/44.9 |
| 2,792,665 | 5/1957 | Brickler | 43/44.9 |
| 4,924,620 | 5/1990 | Kimberley | 43/44.9 |

FOREIGN PATENT DOCUMENTS

| 0131956 | 3/1941 | Sweden | 43/44.87 |
|---|---|---|---|
| 0874385 | 8/1961 | United Kingdom | 43/43.1 |
| 2191671 | 12/1987 | United Kingdom | 43/43.1 |

Primary Examiner—Mark Rosenbaum
Assistant Examiner—James Miner
Attorney, Agent, or Firm—Morton J. Rosenberg; David I. Klein

[57] ABSTRACT

Stable Bobber for Rod Fishing consists of a stream-line conic rod with a plurality of proper holes at the side of its lower portion, or with two stream-line sections in reverse direction wherein one section is formed by cutting off its lower portion; these two kinds of bobber are either suitable for an open water region or for a close water region and are both very stable and sensitive. When the bobber is floating on the water and the color-striped post is affected by discontinual resistance force from waves and wind to oscillate and fall on the surface of water, the bobber can turn its stream-line to the proper direction and maintain itself upright and stable either by rotating itself to balance the back pressure or by gaining a negative pressure, and thus maintain its stability and sensibility.

6 Claims, 8 Drawing Sheets

STABLE BOBBER FOR ROD FISHING

BACKGROUND OF THE INVENTION

1. Field of the Invention

This invention relates to rod fishing tackles and more particularly refers to the structure of a bobber suitable for either open or closed water regions.

2. Prior Art

In general, bobbers are used as a fishing rod tackle to aid the angler to become aware when fish are taking the bait. Thus a bobber should be designed to be both stable and sensitive to motion. Conventionally, bobbers are made of light materials in order that they may float on the water surface. In order to achieve an upright float and maintain stability in the water, such bobbers are designed to have a center of buoyancy located in an upper section thereof. To make them more sensitive, they are generally small and thin in cross-section. Thus, most bobbers are contoured into long, slender, and tapering extended members much in the manner of a cone.

Generally there are two water region types used for fishing: (1) closed water regions in which there is no flowing motion in the water but wind and waves on the surface of the water; and, (2) open water regions in which there are flowing motions in a fixed direction with a predetermined speed of water flow with a further combination of wind and waves on the surface of the water. Conventionally, bobbers which float upright in either closed or open water regions have structural members including the main body of the bobber, color-striped guide-posts, and joint rods. The color-striped guide-post is integral with the top portion of the bobber main body and floats on the water surface. The joint rod is integral with the end portion of the bobber main body and may be used to couple with the fishing line.

Both the joint rod and the bobber main body are located beneath the water surface. When the color-striped guide-post is displaced by the water waves, the resistance, speed and direction of the flowing water as well as the varying direction and discontinuous forces of the wind on the water surface, the bobber main body and fishing line will have a force applied which may be termed a force impulse causing rotation of the bobber.

The conventional or prior art bobber is formed to have a center of buoyancy in an upper section which will counter and oppose the effect of the force impulse applied. However, if the force impulse in one area is greater than in another area, the bobber main body will rotate and fall causing the color-striped guide-post to turn, oscillate and fall simultaneously. This constant movement may have the effect of tiring the fisherman's eyes.

In order to obviate the disadvantages of the prior art bobber, with relation to an unfixed, discontinuous, upright and stable turning effect when the bobber is affected by such discontinuous forces, the subject bobber maintains the sensitivity of prior art bobbers and replaces the conventional bobber which has been found to oscillate and fall in the water, with a more stable bobber.

SUMMARY OF THE INVENTION

The bobber according to the inventive concept has a bobber main body which is composed of a stream-lined rod tapering from an upper to a lower section. The cross-section of the stream-lined rod is completely stream-lined from the upper to lower section. The width and length of the stream-lined section is 1:3.5–4 so that the bobber will be suitable for either closed or open water regions.

According to this invention, the bobber main body is suitable for an open water region and has a plurality of pressure-balancing holes disposed through one side of an end section of the bobber main body and extending beneath a distance five times as long as the width of the cross-section from the top of the main body. The bobber has an unfixed, discontinuous, upright and stable turning effect when the bobber is struck by a varying and discontinuous wind force as well as fluid current. The bobber can maintain itself upright and stable by rotation of the bobber so that a stream-lined end faces the direction of the flowing water.

With relation to the closed water region, the bobber main body is suitable for the closed water region and is formed to a smaller stream-lined section which is a conic section formed in an opposing direction to the bobber main body. The small stream-lined section contour is disposed at one side of the end portion of the bobber main body and beneath the position five times as long as the width of the cross-section from the top of the main body. This contouring fits the design that the rate of a sectional width and length from top to bottom is 1:3.5–4. Therefore, the bobber has a varying, discontinuous upright and stable turning effect when the bobber is struck by a varying and discontinuous wind force and current resistance. The bobber maintains itself in an upright position and is stable. As previously stated for the open water region, the bobber replaces the conventional prior art bobbers which oscillate and fall in the water.

DESCRIPTION OF THE PREFERRED EMBODIMENTS

Bobbers having a high center of buoyancy and stream-lined sections generally have high sensitivity and a low coefficient of resistance. However, different bobbers should be designed for different water regions and the bobber main body should have proper contouring of stream-lined sections to provide maximum effectiveness when the bobber has differing forces applied. The object of this invention is to provide a bobber adaptable to different water regions such as closed and open water regions.

An open water region is defined as a body of water which includes water flow having a fixed speed and a predetermined direction of the water flow including wind forces on the surface of the water.

Figure 1:
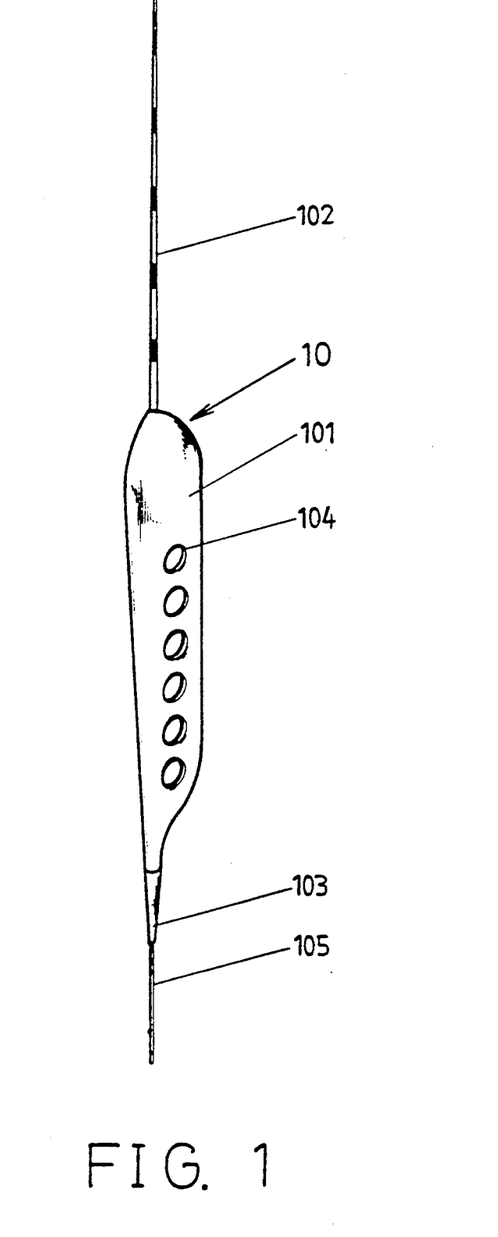
FIG. 1 is a perspective view of the bobber main body according to the subject invention concept.

As shown in FIG. 1, there is provided a perspective view of the bobber main body according to the invention. The bobber 10 consists in combination of a stream-lined bobber main body 10, a color-striped guide-post 102, joint member 103, joint rod 105, connecting post 106, and a round post 108. The upper section of the bobber main body 101 is integral with the color-striped guide-post 102 and the lower section of the main body is integral with joint member 103. On one side of main body 101 there is located a plurality of pressure-balancing holes 104 passing therethrough. The lower portion of joint member 103 is integral with joint rod 105.

Figure 2:
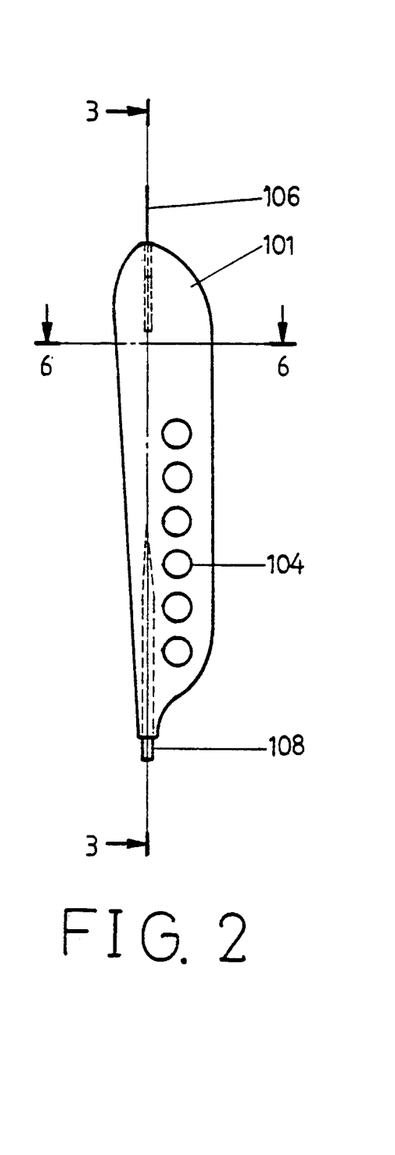
FIG. 2 is a frontal elevational view of the bobber main body connected to a connecting post and a round post at an upper section and a lower section respectively.
Figure 3:
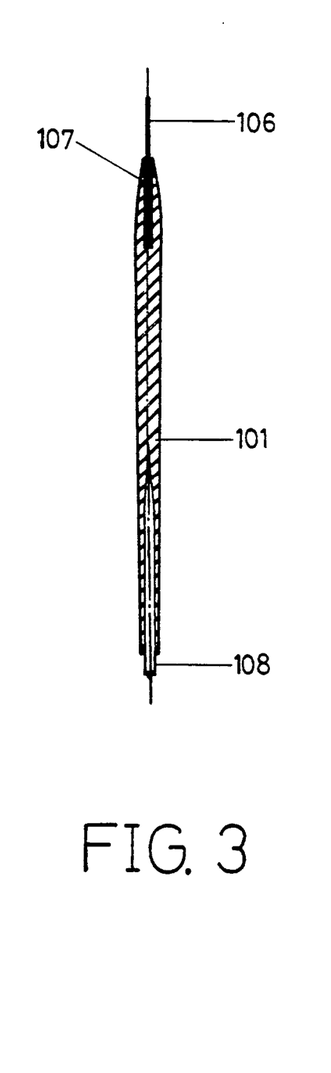
FIG. 3 is a side elevational sectional view of the bobber main body along the line 3—3 of FIG. 2.

In general, the combination of main body 101, color-striped guide-post 102 and joint member 103 is similar to those of a conventional bobber. FIG. 2 shows an elevation view of bobber main body 101, the upper section of the main body 101 has a vertically directed hole formed therein for insert of connecting post 106. A space 107 is formed in between the connecting post 106 and the hole in the upper section of the main body 101 as shown in FIG. 3. This is formed in order that color-striped guide-post 102 may be set in the top portion or section of main body 101. The force fit connection post 106 reinforces the color-striped guide-post 102 and may be used as a joint head member for changing a damaged color-striped guide-post 102.

Figure 4:
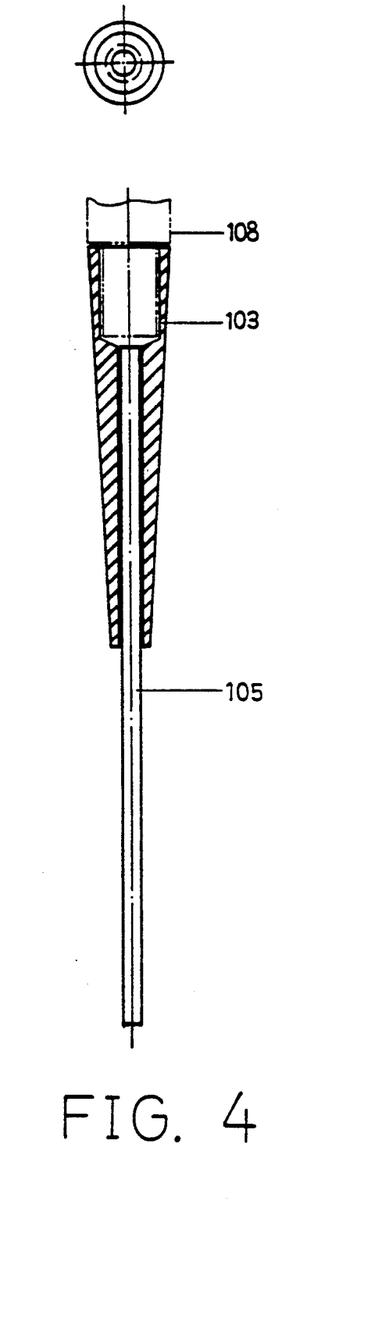
FIG. 4 is a sectional view of the combination of a joint rod, round post, and joint member according to the invention concept herein described.
Figure 5:
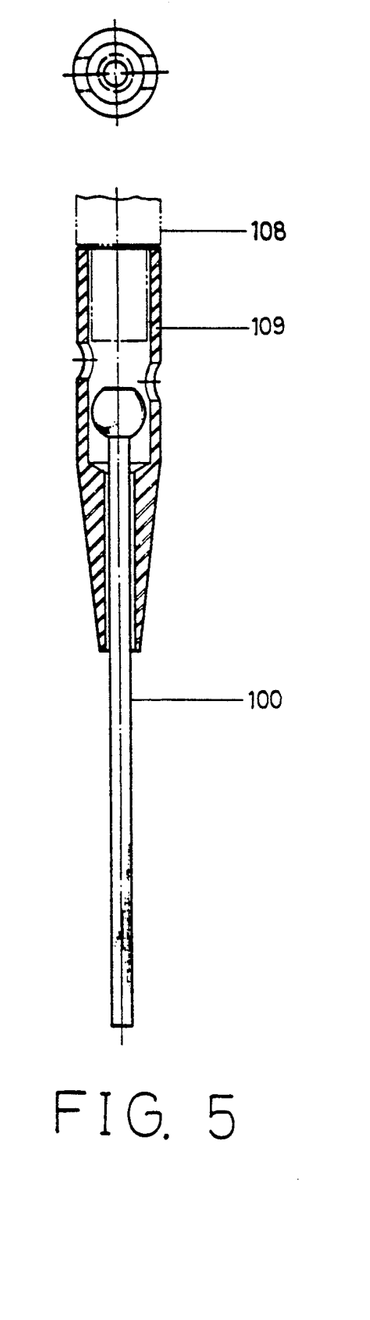
FIG. 5 is a sectional view of the combination of a joint rod, round post, and joint element according to an embodiment of this invention.

The lower section of main body 101 has a round post 108 force fit therein which is set in the inner bore of joint member 103 as shown in FIG. 4. The joint member 103 is used to reinforce the smaller section of the lower portion or section of main body 101. A hole in the end portion of joint member 103 is used to connect a connecting rod 105 to form fixed joint member 103. Referring to FIG. 5, there is shown a sectional view of the combination of joint lever 100, round post 108, and joint element 109 according to another embodiment of this invention. The joint lever 100 may rotate within the joint element 109. The fixed or the rotating joint lever 103 or 109 is respectively suited to be used for live bait or artificial bait.

Figure 6:
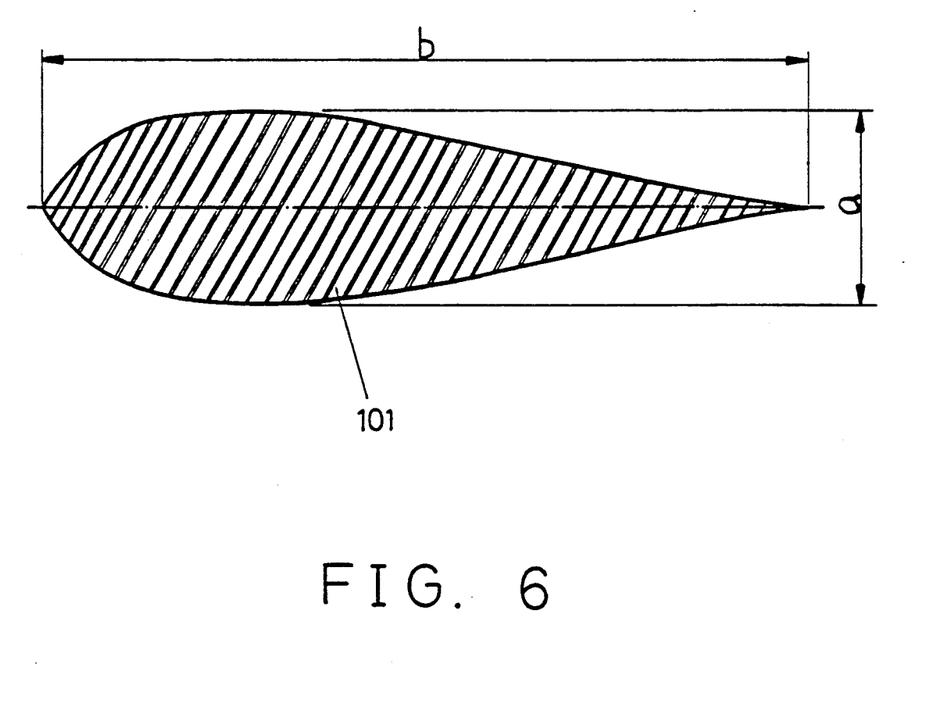
FIG. 6 is a vertical cross-sectional view of the bobber main body along the section line 6—6 of FIG. 2.

An important improvement made by this invention lies in the bobber main body 101 shown in FIG. 2. The main body 101 is a conic section and a stream-lined contour bar tapering from an upper to a lower section. Cross-sections from the upper to lower sections of body 101 are all stream-lined. A cross-sectional view of the bobber main body is shown along line 6—6 of FIG. 2. The width "a" and length "b" of the stream-lined section from upper to lower sections of the main body 101 is approximately 1:3.5-4. The cross-section is formed through conformal transformation in a continuous manner to form a stream-lined contour. The reason why the width "a" and length "b" of the sections of main body 101 is within the range 1:3.5-4, is that the coefficient of resistance is diminished when the width and length of a stream line is within this ratio.

Therefore, when falling water or water speed in a predetermined direction bears against the main body 101, the main body 101 will turn its stream line into the flow motion direction and thus create a lower coefficient of resistance. Forces of water and wind resistance on the water surface are applied to the bobber 10. Wind forces have a discontinuous force effect which is in a varying direction on the bobber 10 which has the effect of causing the bobber to oscillate, fall, and turn eccentrically. This condition results from the separation of the boundary layers on the surface of the main body 101. A plurality of pressure-balancing holes 104 are formed through the main body 101 on one side of the bobber main body 101. The holes 104 extend throughout a distance five times the distance of the width of the cross-section at the upper section of the main body 101. The number of and sizing of the holes 104 may be increased or reduced according to the width and length of the main body 101. Due to the fact that the main body 101 has holes 104 passing therethrough, the volume of its lower section is reduced and the center of buoyancy of the main body 101 is raised, thus making the bobber more stable.

More particularly, when main body 101 is forced to float eccentrically, water will flow through the holes 104 and around the back of the main body 101, thus balancing the pressure on opposing sides. The main body 101 displaces its stream-lined section to face the flowing fluid and thus maintains the smallest force of resistance. Though there are discontinuous forces from varying directions, the bobber 10 only has a rotation displacement and maintains itself upright and stable but retains its sensitivity. This avoids the drawbacks of conventional bobbers which easily oscillate and fall.

The size and numbers of pressure-balancing holes 104 are determined according to the condition that the pressure in the back of the bobber 10 will be balanced and that the stream-lined surface layers will not be separated.

As shown in FIG. 1, the top or upper portion of main body 101 is a convex arcuate contour which terminates at a point adjacent the center. The lower section of the main body 101 is a convex-concave, arcuate contour which ends at a point adjacent to joint member 103. As shown in FIG. 3, the main body 101 is in elevation and is stream-lined so that it has a small comparative value of width and length in the value range of a panel configuration. In this manner, the bobber 10 can attain the goal of securing high sensitivity with low coefficient of resistance when the main body 101 is moving vertically.

Figure 7:
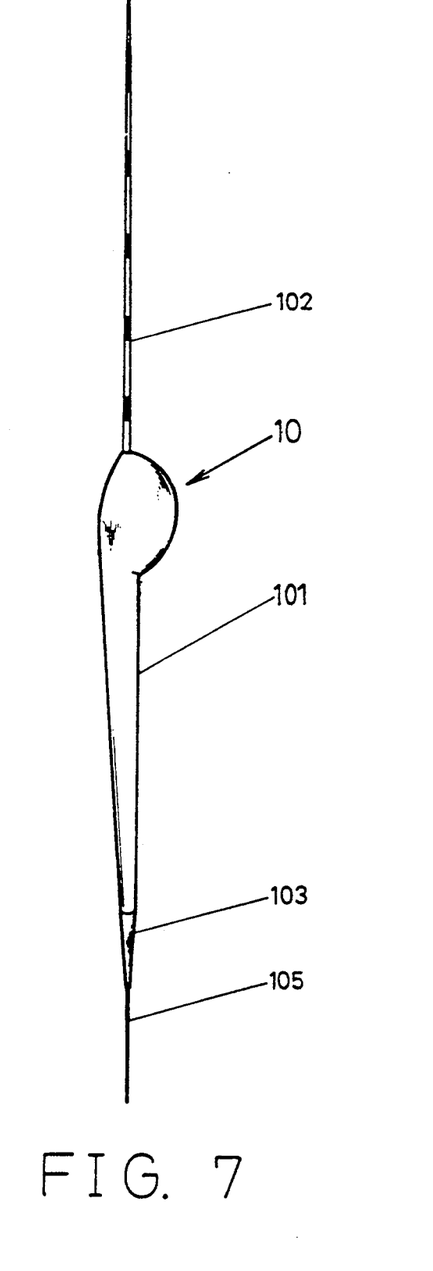
FIG. 7 is a perspective view of the bobber main body according to another embodiment of this invention.
Figure 8:
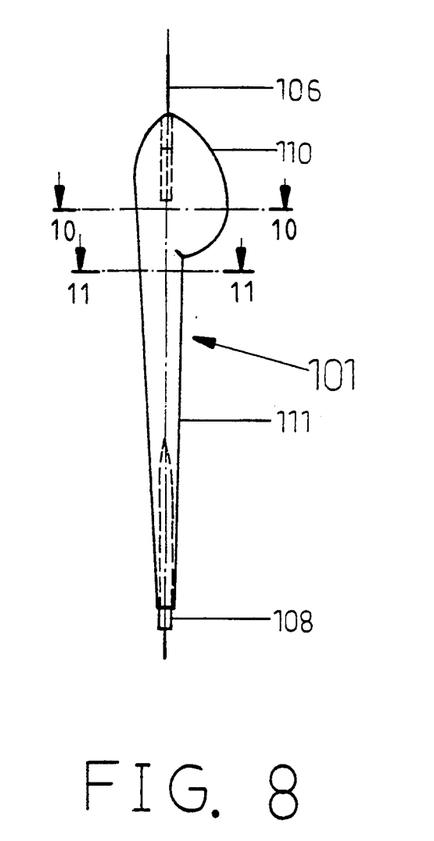
FIG. 8 is an elevational front view of FIG. 7 of the bobber main body connected with a joint rod and a round post at an upper section and lower section respectively.

A closed water region is defined where there are wind and waves on the surface of the water. As shown in FIG. 7, a perspective view of the bobber main body is provided according to another embodiment of the invention. The bobber 10 consists of a stream-lined bobber main body 101, color-striped guide-post 102, joint member 103, joint rod 105, connecting post 106, and round post 108. The upper section of the bobber main body 101 is integral with the color-striped guide-post 102. The lower section of the bobber main body is integral with joint member 103. The structural integrity of the bobber 10 is the same as that of the bobber for the open water region, as shown in FIGS. 8 and 9.

On the lower section of the main body 101 there is provided stream-lined arcuate contouring. The lower portion of joint member 103 is formed integral with a joint rod 105. In general, the combination and arrangement of and between the main body 101, color-striped guide-post 102, and joint member 103 is similar to those for the bobber previously described for the open water region. As shown in FIG. 8, the upper section of the main body 101 has a hole formed therein for insert of connecting post 106. A space 107 is provided between the connecting post 106 and the hole in the upper section of the main body 101 as shown in FIG. 3 so that color-striped guide-post 102 may be set in the top portion of the main body 101. The force fit connecting post 106 reinforces the color-striped guide-post 102 and can be used as a joint head for possibly changing a damaged color-striped guide post 102.

The lower section of the main body 101 has a round post 108 force fit therein which can be set in the inner bore of the joint member 103. The joint member 103 is used to reinforce the smaller section of the lower portion of the main body 101. The hole in the end portion of the joint member 103 is used to connect a connecting-rod 105 to form a fixed joint member 103.

Figure 9:
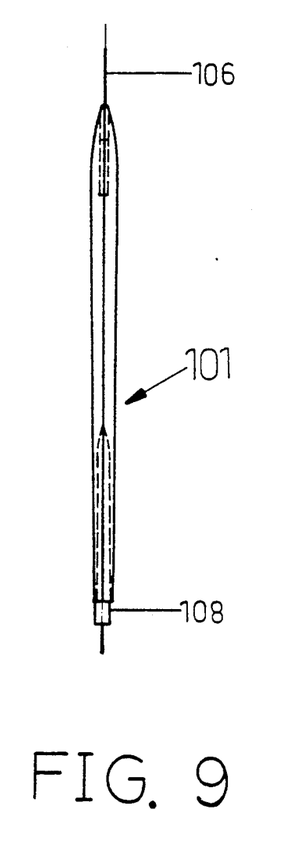
FIG. 9 is a plan side view of FIG. 7 of the bobber main body connected with a joint rod and a round post in upper and lower sections respectively.

Referring to FIG. 9, there is shown a sectional view of the combination of jointing lever 100, round post 108 and joint element 109 according to still another embodiment of the invention. The joint lever 100 is rotatable within the joint element 109. The fixed joint lever 103 or the rotating joint lever 109 are respectively suitable for use with live bait or artificial bait.

Figure 10:
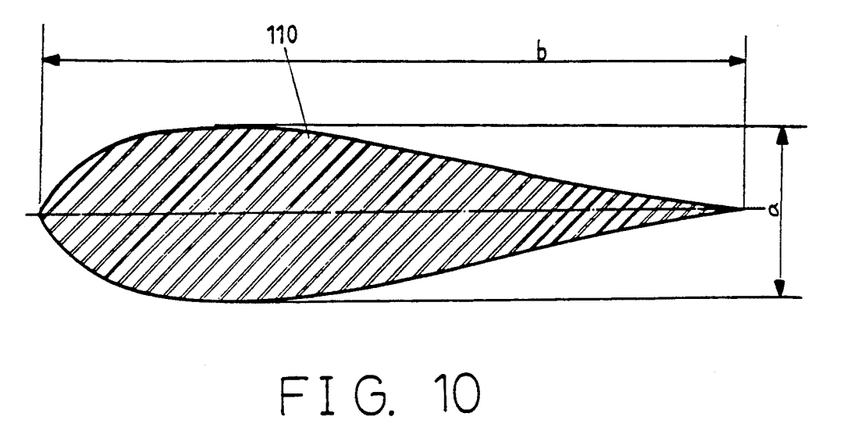
FIG. 10 is a cross-sectional view of the upper portion of the bobber main body taken along the section line 10—10 of FIG. 8.

An important improvement made in this invention lies in the bobber main body 101 as shown in FIG. 8. The bobber main body 101 is generally conically contoured and is a stream-lined bar which tapers from an upper to a lower section with cross-sections from upper to lower positions being stream-lined. As shown in FIG. 10, there is provided a cross-sectional view of the bobber main body 101 taken along section lines 10—10 of FIG. 7. The width to length ratio of the stream-lined section is approximately 1:3.5-4. The lower portion 111 of the main body 101 is a partially cut off section which is contoured in a direction reverse to the contour of the section of the upper portion 110. The coefficient of resistance is minimized when the width and length of a stream line is rated as 1:3.5-4. Therefore, when there is a flowing motion or a fixed directional speed of fluid, the main body 101 turns its stream-lined face to the flowing motion direction and creates a minimal coefficient of resistance.

Figure 11:
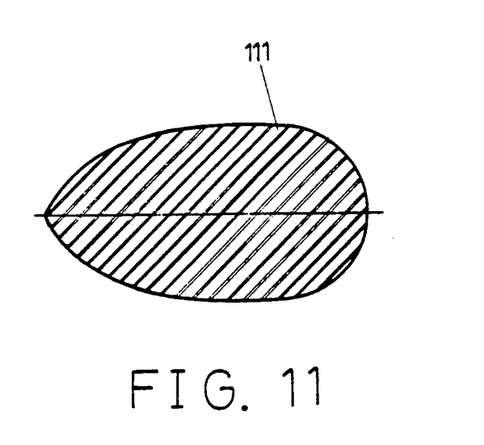
FIG. 11 is a cross-sectional view of the end portion of a bobber main body taken along the section line 11—11 of FIG. 8; and, FIG. 12 is a view of an embodiment of the bobber shown in FIG. 7 in operational use.

Water resistance and wind forces on the water surface will create a force impulse upon the bobber 10, especially when the wind has a discontinuous force of varying direction applied to the bobber 10. The bobber 10 easily oscillates, falls, and turns eccentrically under such conditions. As shown in FIG. 11, the stream-lined cross-section of the lower end portion 111 is cut off to form an inward arc which extends downwardly in a substantially straight line to joint member 103 and thus forms a stream-lined section of lower portion 111 in a reverse direction to the upper section 110 contour of the main body 101.

This arc is located on one side of the end portion of the bobber main body 101 and beneath the upper end a distance of five times as long as the width of the cross-section from the top of the main body 101. The lower portion 111 is wider and longer than the upper portion 110 of the stream-lined section and is formed in a reverse direction. The lower portion 111 is half as long as the upper portion 110. The design of these stream-lined sections has a low resistance in the water because of its better stream line and raises the center of buoyancy of the main body 101 and thus makes the bobber more stable.

More particularly, when the main body 101 is forced to float eccentrically, some water will flow through and thus balance the negative pressures on the back of the bobber 10 and forces the stream-lined bobber to return to its proper direction and position. The main body 101 displaces its stream-lined section to face the flowing water so as to maintain the smallest force of resistance. Though there are discontinuous forces from varying directions, the bobber 10 rotates on its axis and maintains itself upright and stable. The drawback of a conventional bobber relating to oscillation is alleviated.

As shown in FIG. 7, the top portion 110 of main body 101 is an arc which ends at a point adjacent to the center and the lower portion 111 of the main body 101 is a stream-lined end portion which ends at a point adjacent to the joint member 103.

Figure 12:
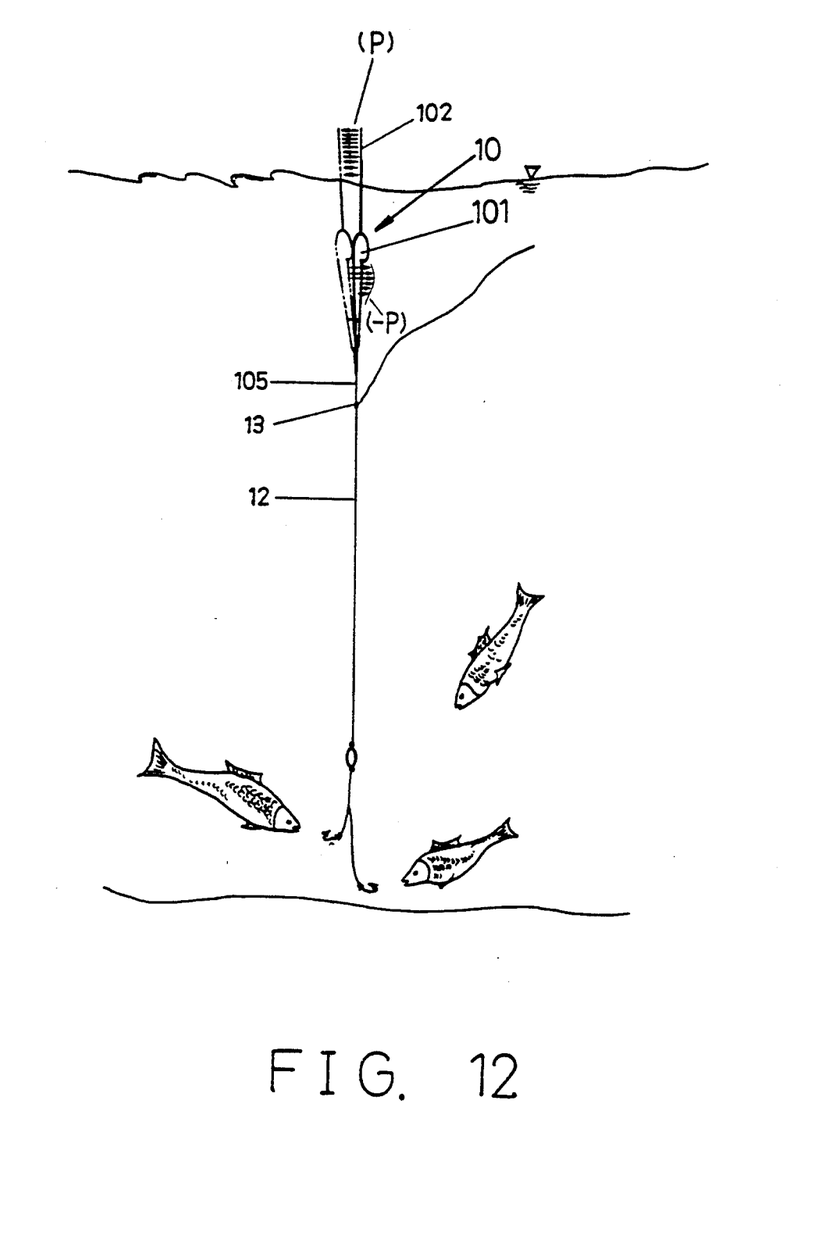

As shown in FIG. 12, bobber 10 and joint rod 105 may be inserted into a positioning sleeve 13 to fix the bobber 10 on the fishing line 12. When color-striped post 102 is struck by waves or blown by the wind as shown by element P in FIG. 12, the main body 101 will turn to face the waves and the wind due to the fact that upper portion 110 has a stream-lined section. When the force of waves and wind makes the body 101 oscillate and fall, the reverse stream-lined section of its lower portion 111 will provide a negative pressure for the main body 101 as shown by element -P in FIG. 12 to return to its normal position.

Because resistance force in water and wind on the water surface will provide a force impulse on the bobber 10, the wind will have discontinuous forces of varying direction applied to bobber 10 and the bobber oscillates and turns eccentrically.

A plurality of pressure-balancing holes 104 are formed at one side of the end portion of the bobber main body 101. Because the main body 101 has holes 104, the volume of its lower portion can be reduced and the center of buoyancy of the main body 101 is raised and thus makes the bobber more stable.

More particularly, when main body 101 is forced to float eccentrically, some water will flow through the holes 104 and to the back of the main body 101 and balance the pressure in the back and thus makes the stream-lined section return to its proper position. The main body 101 returns its stream-lined section to face the flowing motion of the fluid and maintains the smallest resistance force. Though there is a discontinuous force from varying directions, the bobber 10 only rotates and maintains itself upright and stable.

The combination of joint lever 100, round post 108, and joint element 109 for another embodiment of this invention is designed for using artificial bait, because the joint lever 100 can rotate within the joint element 109. The fixed joint lever 103 is suitable to be used for live bait, but the rotating joint 109 is suitable for artificial bait.

What is claimed is:
1. A stable bobber for rod fishing comprising:
   (a) a bobber main body extending in a vertical direction having opposing upper and lower end sections having respective vertically directed recesses for force fit insert of a connecting rod within said upper section and a round post member within said lower section;

(b) an elongated color striped post member secured to said connecting rod within said bobber main body upper section; and (c) a joint member fixedly secured at an upper section thereof to a lower section of said round post member, said joint member having a joint rod member insertable therein and extending from a lower section thereof, said bobber main body having an aerofoil cross-sectional contour defining a width to length ratio of said cross-sectional contour within the approximate range of 1:3.5 to 1:4.

2. The stable bobber as recited in claim 1 wherein said bobber main body including at least one opening passing through said bobber main body for balancing water force applied to said bobber main body on opposing sides thereof.

3. The stable bobber as recited in claim 2 including a predetermined number of vertically aligned openings formed through said bobber main body, said predetermined number of said vertically aligned openings for locating a center of buoyancy of said bobber main body in a stabilizing position.

4. The stable bobber as recited in claim 2 where said bobber main body is arcuately contoured in a convex configuration, said bobber main body lower section being arcuately contoured for continuous interface with said joint member, said bobber main body lower section arcuate contour defining a convex and concave continuous curvature.

5. The stable bobber as recited in claim 1 wherein said bobber main body lower section is arcuately contoured in said vertical direction on one side thereof for continuously interfacing with said joint member, said arcuately contoured bobber main body lower section defining a convex and concave continuous curvature.

6. The stable bobber as recited in claim 5 where said upper section of said bobber main body is arcuately contoured in a convex configuration and said lower section of said bobber main body is arcuately contoured to form a streamline interface with said joint member.

* * * * *